3,304,300
METHOD FOR ISOLATION AND PURIFICATION OF HMX

James W. Watters, Washington, D.C., assignor to the United States of America as represented by the Secretary of the Navy
No Drawing. Filed Aug. 26, 1964, Ser. No. 392,350
6 Claims. (Cl. 260—239)

The invention described herein may be manufactured and used by or for the Government of the United States of America for governmental purposes without the payment of any royalties thereon or therefor.

This invention relates to a novel method of separating, in high purity, 1,3,5,7-tetranitro-1,3,5,7-tetrazacyclooctane (commonly known as HMX), a solid nitramine explosive and propellant ingredient, from the byproducts formed with it in synthesis. More particularly, the invention is directed to a novel method for the preparation and isolation of a molecular addition compound from which pure HMX may be regenerated.

The aliphatic nitramines comprise a group of organic explosives of great interest because of their outstanding properties. Of the nitramines, the most outstanding are 1,3,5-trinitro-1,3,5-triazcyclohexane (RDX) and 1,3,5,7-tetranitro-1,3,5,7-tetrazacyclooctane (HMX).

In the standard synthesis of HMX by nitrolysis of hexamethylene tetramine, isolation of the product is both tedious and expensive and results in the recovery of four polymorphic forms. Apparently, because of differences in the arrangement of the molecules and the lattice energies of the polymorphs, the various forms of HMX exhibit different impact sensitivities. Thus, the following impact sensitivities for four HMX modifications were observed on a test machine which gave a sensitivity reading of 43 cm. for purse RDX:

|  | Cm. |
|---|---|
| Beta-HMX | 33 |
| Alpha-HMX | 12 |
| Gamma-HMX | 7 |
| Delta-HMX | 5 |

It is thus seen that the beta-HMX polymorph does not differ widely in impact sensitivity from pure RDX, but that the alpha, gamma and delta modifications may be extremely sensitive.

Synthetic mixtures of RDX with varying amounts of the individual HMX polymorphs have been prepared and the impact sensitivities thereof indicate that small amounts of the alpha, gamma and delta modifications of HMX may render the resulting mixture dangerously sensitive, whereas the beta modification does not lower the sensitivity of the mixture below a safe minimum. It is therefore obvious that the preparation of HMX wherein all or at least most of the product is recovered as the beta polymorph is of considerable interest. Under the conditions of the standard synthesis of HMX, the unstable gamma form appears first but changes rapidly and spontaneously to the metastable alpha form. This in turn must be completely converted to the stable beta form which is preferred for its lower sensitivity. In order that standard mixtures of HMX and RDX may be prepared, it is necessary not only that the HMX be in the beta polymorphic form but, also, it is necessary that the HMX which is used is not contaminated with other impurities resulting from its synthesis. One of the major so-called impurities contained in HMX, prepared by the standard synthesis, is RDX which may be contained in the recovered HMX by an amount of 10% or more. This RDX is especially difficult to remove because of its close physical and chemical similarity to HMX and its solubility in solid beta-HMX.

In current practice, the essential feature of HMX synthesis is the simultaneous and equivalent addition, at carefully controlled moderate temperatures, of an ammonium nitrate-nitric acid solution and a solution of hexamethylene tetramine in glacial acetic acid, to a glacial acetic acid-acetic anhydride medium containing paraformldehyde. There are conventionally two rounds of additions, each followed by an aging period. Subsequently, the reaction mixture is diluted with water, enough to reduce the acetic acid content to about 70%, and either simmered just below the boiling point or refluxed for a period of from about thirty minutes to about two hours. During this period some byproducts are hydrolyzed and dissolved in the 70% acetic acid, some excess formaldehyde is volatilized and the HMX changes to the alpha polymorphic form.

Heretofore, three principal methods have been used for the removal of RDX from HMX. The English practice is to filter the suspension of alpha-HMX in 70% acetic acid obtained in the simmering operation while it is still hot (above 80° C.), then the water-washed filter cake is reslurried in hot water (about 2900 lbs. of water for about 135 lbs. of HMX), stirred for another hour at 95–100° C. and again filtered hot. Most of the RDX, which is practically insoluble in solid alpha-HMX, dissolves in the hot acetic acid or the hot water and is removed in the filtrates. The product is alpha-HMX containing up to about 3% RDX, most of which is removed in a later percolation with dilute acetone. The percolation also converts the HMX to the beta form and the final product contains RDX in an amount of up to about 1%.

Another method for the removal of RDX comprises, after the simmering step, cooling and filtering the suspension remaining after the simmering step as related in the English method. The filter cake, containing 10 to 15% RDX is then dissolved at the boiling point of the solution in 1500 lbs. (for a 400 lb. batch of HMX) of 94% aqueous acetone which is distilled away and simultaneously replaced with about 1300 lbs. of water. The aqueous suspension is then cooled and filtered. This operation, requiring five hours, converts alpha-HMX to the beta polymorph and reduces the acetic acid content, but removes little or no RDX.

The wet filter cake is then subsequently heated and stirred for thirty minutes at 50° C. with about 530 lbs. of 80% acetone which is sufficient to dissolve the RDX present. After a forty-five minute settling period a supernatant liquid is decanted and thirty gallons of water are added to the settled-out product which is then cooled to 30° C. prior to filtration. The acetone extraction procedure reduces the RDX content to a level of less than 2% but, nevertheless, a pound of HMX is removed with the separation of each three pounds of RDX.

The third method of RDX removal is in connection with the synthesis of HMX by the Bachmann continuous process, and depends on the greater susceptibility of RDX, as compared with HMX, to alkaline hydrolysis. With care, most of the RDX can be hydrolyzed while most of the HMX remains. In removing RDX by this method, the crude alpha-HMX containing about 20% RDX, is first converted to the beta polymorph by digestion with aqueous acetone. Next, the acetone is distilled off and borax (about 20 lbs to 500 lbs. of HMX) is added. The aqueous suspension, still hot from the acetone distillation, is then titrated in effect with 50% sodium hydroxide while the pH is closely observed. As long as RDX remained, the pH increased gradually in the 8.6 to 8.8 range. When the pH rose steeply to 9.7 or higher, addition of alkali was discontinued. The mixture was then cooled and neutralized with acetic acid and the suspended HMX was ground to the desired size and recovered by filtration. By this method, most of the RDX was removed by the differential hydrolysis, but considerable HMX was also lost.

It should be noted that all of the past methods for removal of RDX required large volumes of solvent and extended manipulation.

Accordingly, in view of past attempts to remove RDX with large amounts of solvent and tedious manipulative procedures, the objects of this invention are as follows:

(1) The purification of HMX, and separation of same from impurities and byproducts such as RDX without the use of large volumes of solvents or extended manipulation, by the formation of molecular addition compounds from which pure HMX may be regenerated.

(2) To control particle size distribution and the mean diameter of the particles of the final product.

(3) To provide a method by which purified HMX may be isolated as the desired beta polymorph.

It has now been found that the above objects of this invention may be accomplished by the method of this invention which, in general, comprises three steps:

(1) Preparation and isolation of a molecular addition compound or adduct of HMX and an addition compound-forming agent. In this step the HMX is separated from all but traces of other compounds.

(2) Regeneration of purified HMX from the addition compound by removing the addition compound-forming agent.

(3) Conditioning the regenerated HMX by digestion with a suitable solvent. This step performs several functions. The regenerated HMX consists originally of agglomerated fine crystals and it is essential to break up the agglomerates and to permit the crystals to grow to the desired size. Digestion further reduces trace impurities and insures that any HMX not already in the beta form is converted to the beta polymorph.

Specifically, the objects of this invention may be accomplished by the preparation of certain molecular adducts which HMX forms with addition compound-forming agents such as dimethylformamide, dimethylacetamide and dimethylaniline. These crystalline adducts or addition compounds are formed by the addition of about one molar proportion of HMX to one mole of the particular addition compound-forming agent used. The adducts are readily prepared by methods commonly used in the crystallization art, that is, HMX is dissolved in a suitable quantity of a particular addition compound-forming agent by warming and, as the solution cools, the adduct crysallizes out and may be separated by filtration.

The addition reaction may be reversed by vaporizing the addition compound-forming agent (i.e., for example, dimethylformamide) from the adduct or by dissolving the adduct in a solvent in which the addition compound-forming agent is soluble but in which HMX has no solubility. Thus, the HMX may be easily regenerated from the formed adduct. Since in the original formation by crystallization of the molecular compound all substances other than the two adduct-forming components are automatically rejected, the regenerated HMX is in a highly purified condition, and more highly freed of contaminates than if it had undergone ordinary crystallization. Moreover, any impurities which remain are located superficially rather than within the bodies of the crystals and are therefore easily susceptible to still more complete removal by a simple wash with suitable solvents. Thus, where solubility relations are favorable and similar molecular addition compounds are not formed by RDX or other byproducts of HMX synthesis, the method provides a highly efficient means for separation of HMX from its byproducts.

An illustrative application of the principle of this invention is the case of the addition compound formed between HMX and dimethylformamide. The solution of HMX in dimethylformamide is complete at about 100° C. at a concentration of about 4 ml. of dimethylformamide per gm. of HMX. As little as 1 ml. per gm. of HMX may be used at the boiling point of the solution. At 25° C. the solubility is about 2.5 gms. of the addition compound or about 2.0 gms. of HMX per 100 ml. of dimethylformamide. Therefore, the addition compound may be recovered in 90% yield or better from its solution in excess dimethylformamide. At ambient temperatures RDX is more than ten times as soluble as HMX and it does not form a dimethylformamide addition compound. Therefore, despite its chemical and physical similarity to HMX, the RDX is rejected like other impurities. Dimethylformamide is also a good solvent for other byproducts with which crude HMX, as separated in manufacture, may be associated, all of which are rejected in the formation of the molecular addition compound.

The dimethylformamide addition compound has the further advantage that it is decomposed upon contact with water, acetone, methanol and similar solvents and therefore the adduct may be suspended in water at room temperature or at the boiling point and regenerated HMX may be recovered by filtration. Moreover, regeneration may be accomplished by simply washing on the filter with water or aqueous acetone or methanol. Since the decomposition of the addition compound occurs in the temperature range where beta-HMX is stable, the regenerated HMX is predominately in the beta form.

The separation of the regenerated material by filtration is accomplished easily because the small HMX crystals are agglomerated into larger clusters which retain the hexagonal form of the addition compound.

The control of the mean diameter and size distribution of the particles of the final purified product is accomplished by digesting or refluxing the product in a suitable solvent such as aqueous acetone or cyclohexanone. In such process, the agglomerates break up and the crystals grow. Any HMX not in the beta form is converted to the beta polymorph and trace impurities are further reduced. With variations in the composition and volume of the solvent and the duration of the digestion period, the size distribution and mean diameter of the particles of the final product are thereby controlled.

Drop test data indicate that the HMX-dimethylformamide addition compound is only about 60% as sensitive to shock as pure HMX. Differential thermal analyses indicate that hot mixtures of HMX and dimethylformamide such as would be used for preparation and isolation of the addition compound, are also reasonably safe since the first exotherm begins at 210° C., well above the boiling point of dimethylformamide. By distillation under reduced pressure, dimethylformamide may be recovered from the filtrate after separation of the addition compound and the filtrate may be safely taken down to dryness at temperatures below 100° C.

The following examples are intended to be illustrative of the process herein disclosed and should not be construed as a limitation of the scope or variations thereof.

*Example I*

A mixture of 15 gms. HMX and 5 gms. RDX was dissolved in a 125 ml. Erlenmeyer flask by boiling with 35 ml. dimethylformamide. The boiling solution was poured through a 15 cm. filter paper, supported in a stemless funnel and wet with 3 ml. dimethylformamide, into a second 125 ml. Erlenmeyer which was heated from below. The second flask contained a glass-coated stirring magnet and that part of the 3 ml. dimethylformamide which had passed through the filter. The emptied dissolving flask was rinsed with 3 ml. dimethylformamide which was boiled and poured into the last of the hot solution in the filter.

The hot filtrate was stirred as it cooled to room temperature and then for 10 to 15 minutes in an ice bath. The precipitated addition compound was filtered with suction, the last portions were washed onto the filter with filtrate and rinsed finally with 3 ml. dimethylformamide at room temperature. The pressed-out filter cake weighed 17.8 gms. This was heated just to the boiling point with 35 ml. water and again filtered with suction while the water was still hot. The pressed-out filter cake, oven dried at 80° C., weighed 13.7 gms. The RDX content of the recovered HMX, estimated by X-ray diffractometry, was between 0.1 and 0.2%.

It should be noted from the above figures that in one step, 99% of the RDX was removed.

*Example II*

The crude product from a batch of HMX prepared by the method of Picard (U.S. Patent 2,983,725) served as raw material. In Picard's procedure the reaction mixture after dilution is refluxed for only 30 minutes and then cooled before filtering off the product. Therefore, a relatively high proportion of byproduct impurities is expected, more than in procedures where refluxing or simmering continues longer.

The moisture content is high in any case because of absorption by $\alpha$-HMX which forms a felt-like press cake of long, rather elastic crystals. Even when well pressed-out, the product contains about 55% water.

Seventy gms. of the crude product, still moist but pressed-out as completely as possible, were dissolved in 120 ml. dimethylformamide. The cloudy solution was boiled until it cleared to drive off water and acetic acid and it was then filtered hot with two 25 ml. portions of boiling dimethylformamide used to rinse the dissolving flask. The combined filtrate was cooled to room temperature with stirring. The precipitated addition compound was filtered off and washed on the filter with two 5 ml. portions of the dimethylformamide and two 50 ml. portions of water. It was then suspended in 100 ml. water which was brought just to the boiling point before separating the product. After drying at 80° C., the purified HMX weighed 23.7 gms. Another 1.4 gm. was recovered by refrigerating the filtrate resulting from the first separation of the addition compound.

The RDX content of the purified HMX, measured by X-ray diffractometry, was between 0.2 and 0.3 percent. When 3 gms. of this material were refluxed with 30 ml. 50% acetone, cooled to 30° C. and filtered, the RDX content of the recovered product was less than 0.1 percent.

As set forth supra, either dimethylacetamide or dimethylaniline may be substituted for dimethylformamide in the above examples. Further, although for illustrative purposes the temperatures of dissolution of the adduct and regeneration of HMX are at about the boiling points of the solutions, it is preferable that the dissolution and regeneration steps be carried out at temperatures of about 100° C. or lower.

The HMX purified in the manner described supra is superior to the usual commercial product since, because of its high purity, its density has the theoretical value (1.91 gms./cc. at 25° C.) and it can be wet for safety in shipping and later dried out without caking. Moreover, because of its relatively uniform particle size and smooth texture it is easy to handle, can be poured with little friction and small tendency to acquire a static charge.

The purification of HMX through its adducts with dimethylformamide, dimethylacetamide and dimethylaniline is cheaper than the roundabout methods now customary because recovery of HMX is more complete, the apparatus required is simpler and the processing is accomplished with fewer steps. Moreover, the addition compound-forming agent may be recovered and recycled.

Obviously many modifications and variations of the present invention are possible in the light of the above teachings. It is therefore to be understood that, within the scope of the appended claims, the invention may be practiced otherwise than as specifically described.

Having thus described the invention, what is claimed and desired to be secured by Letters Patent of the United States is:

1. A method of purifying HMX which comprises:
   (a) dissolving impure HMX in a complexing agent selected from the group consisting of dimethylformamide, dimethylacetamide and dimethylaniline,
   (b) separating the addition compound from the solution, and
   (c) regenerating HMX free from impurities from the molecular addition compound.

2. The method of claim 1 wherein the regeneration is effected by contacting the molecular addition compound with a solvent in which the complexing agent is soluble and the HMX is insoluble.

3. The method of claim 2 wherein said solvent is selected from the group consisting of water, acetone and methanol.

4. The method of claim 1 where the regeneration is effected by evaporating the complexing agent.

5. The method of claim 1 wherein the complexing agent is dimethylformamide.

6. The method of claim 1 wherein the regenerated HMX is digested in a solvent to control particle size.

References Cited by the Examiner

UNITED STATES PATENTS

| | | | |
|---|---|---|---|
| 2,798,102 | 7/1957 | Schaeffer et al. | 260—299 |
| 2,959,587 | 11/1960 | Johnson et al. | 260—239 |
| 3,030,376 | 4/1962 | Liggett et al. | 260—299 |

OTHER REFERENCES

MacArdle: The Use of Solvents in Synthetic Organic Chemistry (New York, 1925), pages 4 and 16 to 19.

ALEX MAZEL, *Primary Examiner.*

HENRY R. JILES, *Examiner.*

A. D. ROLLINS, *Assistant Examiner.*